Sept. 28, 1954   C. C. CUTLER   2,690,508
DIRECTIVE ANTENNA SYSTEM
Filed Jan. 10, 1947   9 Sheets-Sheet 1
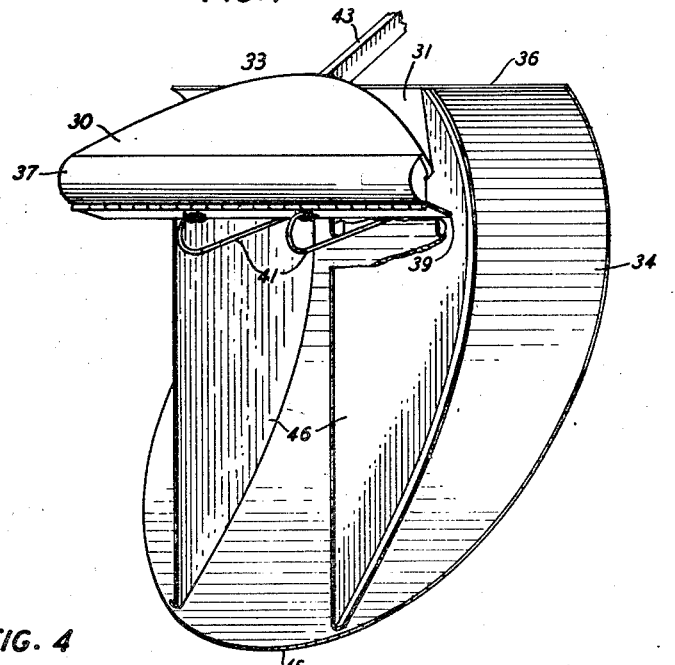
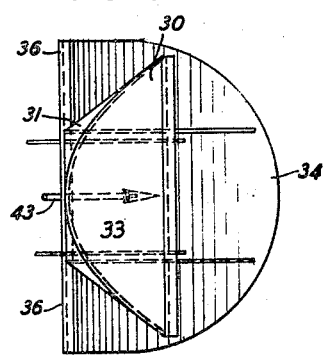
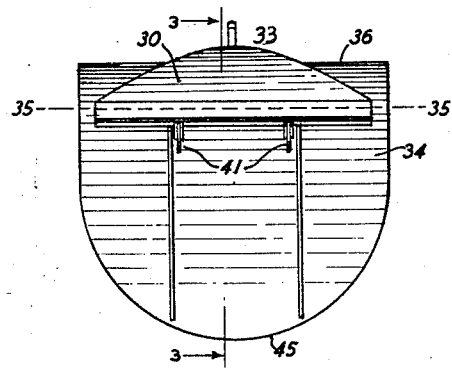
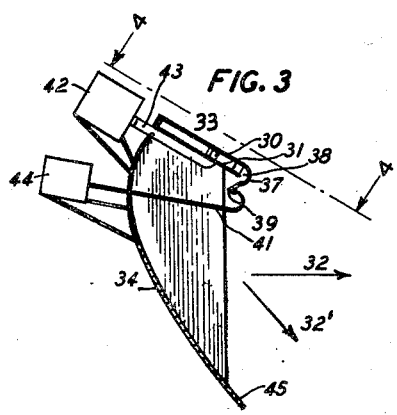
INVENTOR
C. C. CUTLER
BY a. J. Zerbarini
ATTORNEY Sept. 28, 1954 C. C. CUTLER 2,690,508
DIRECTIVE ANTENNA SYSTEM
Filed Jan. 10, 1947 9 Sheets-Sheet 2

INVENTOR
C.C. CUTLER
BY
*A. J. Zerbarini*
ATTORNEY

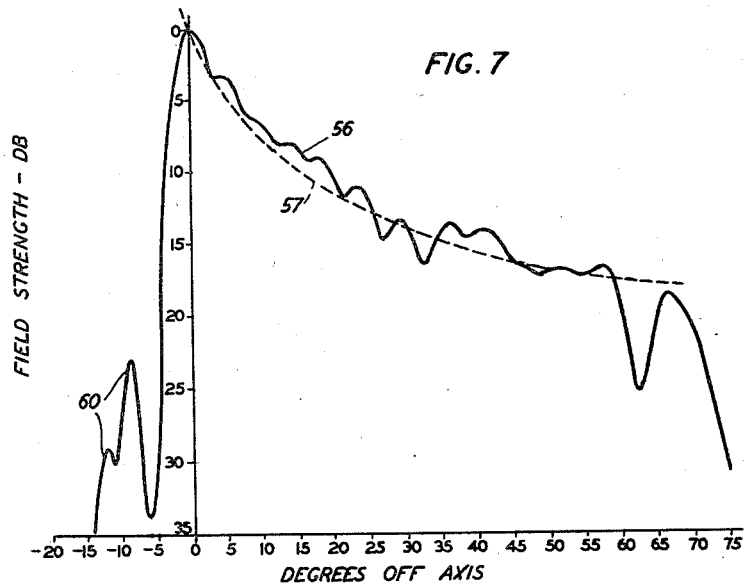
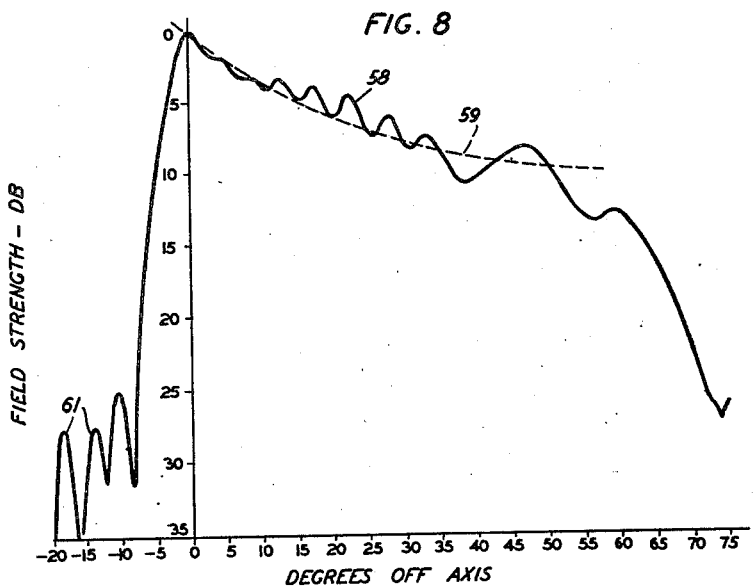

Sept. 28, 1954 C. C. CUTLER 2,690,508
DIRECTIVE ANTENNA SYSTEM
Filed Jan. 10, 1947 9 Sheets-Sheet 5

INVENTOR
C. C. CUTLER
BY
A. J. Zerbarini
ATTORNEY

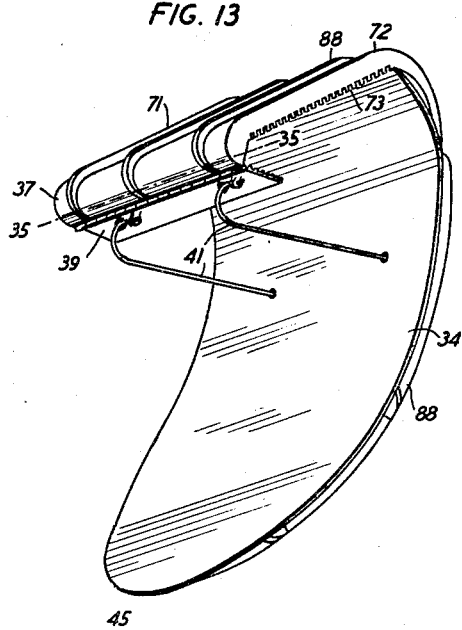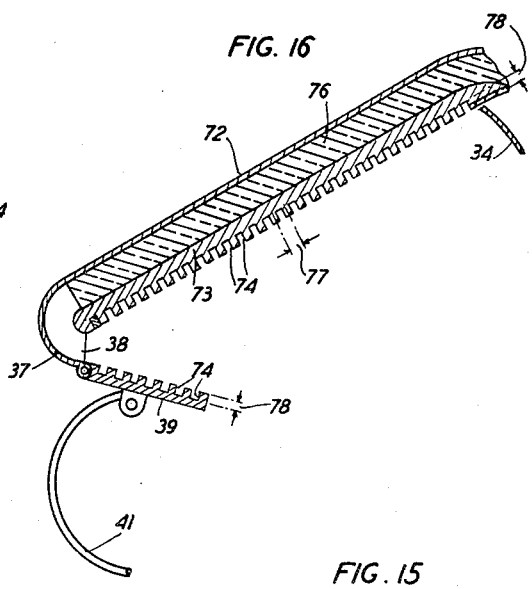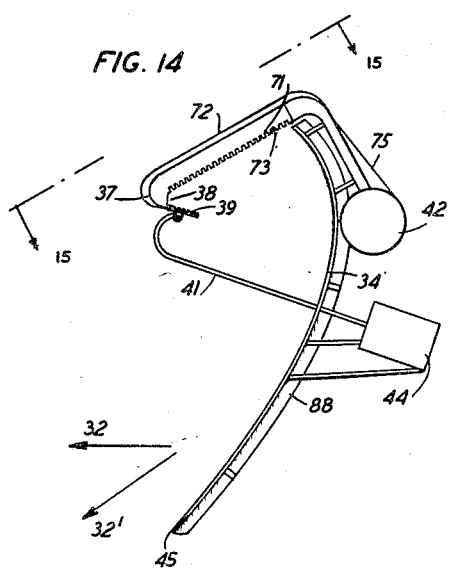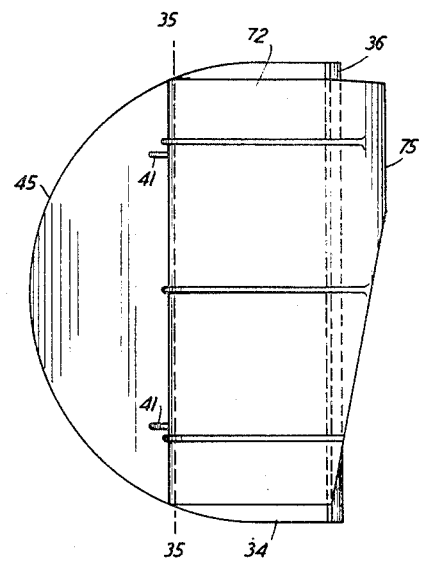

Sept. 28, 1954  C. C. CUTLER  2,690,508
DIRECTIVE ANTENNA SYSTEM
Filed Jan. 10, 1947  9 Sheets-Sheet 7
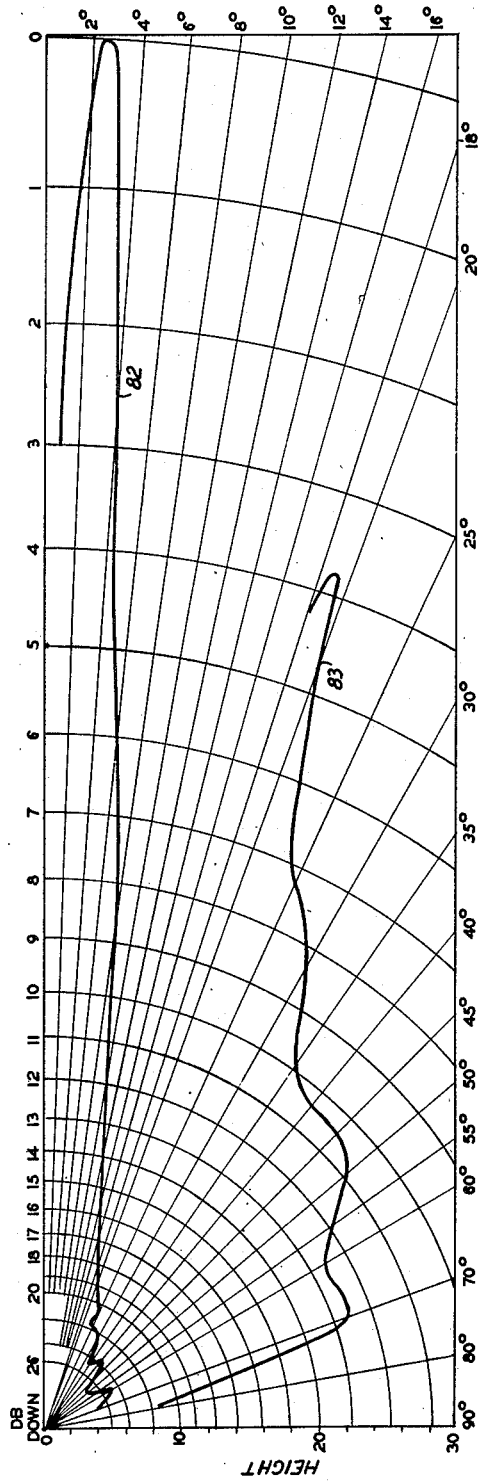
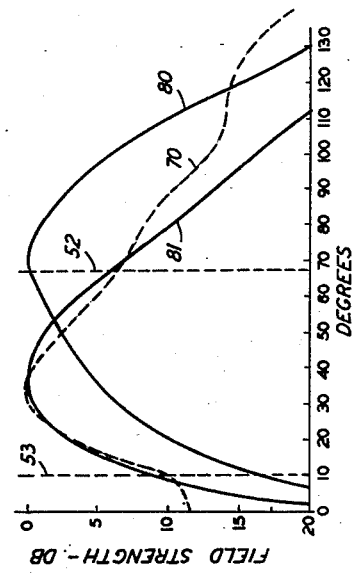
INVENTOR
C.C.CUTLER
BY
ATTORNEY Sept. 28, 1954     C. C. CUTLER     2,690,508
DIRECTIVE ANTENNA SYSTEM
Filed Jan. 10, 1947     9 Sheets-Sheet 9
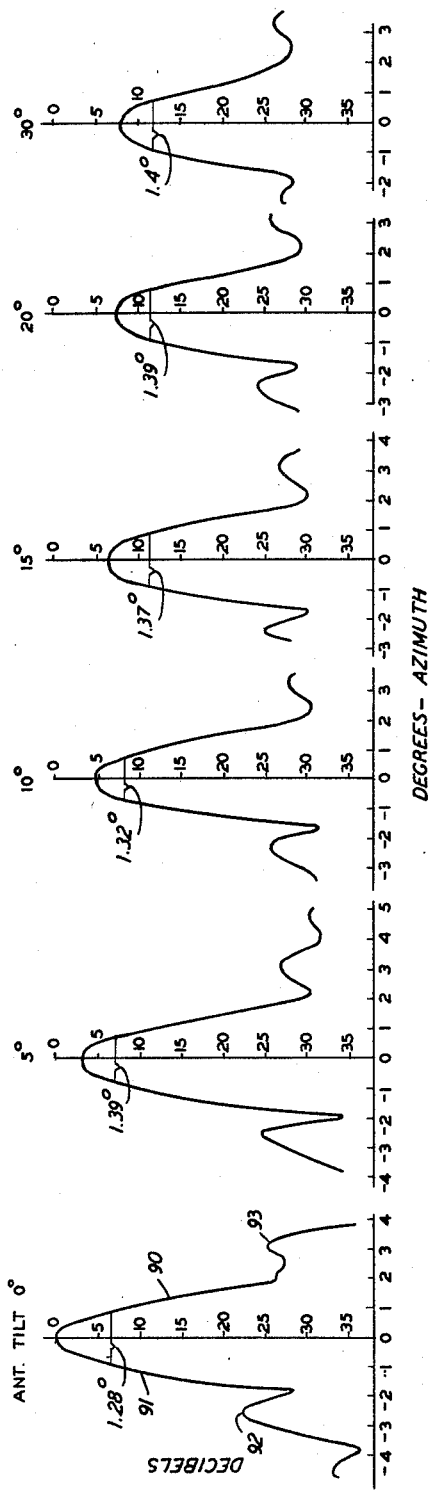
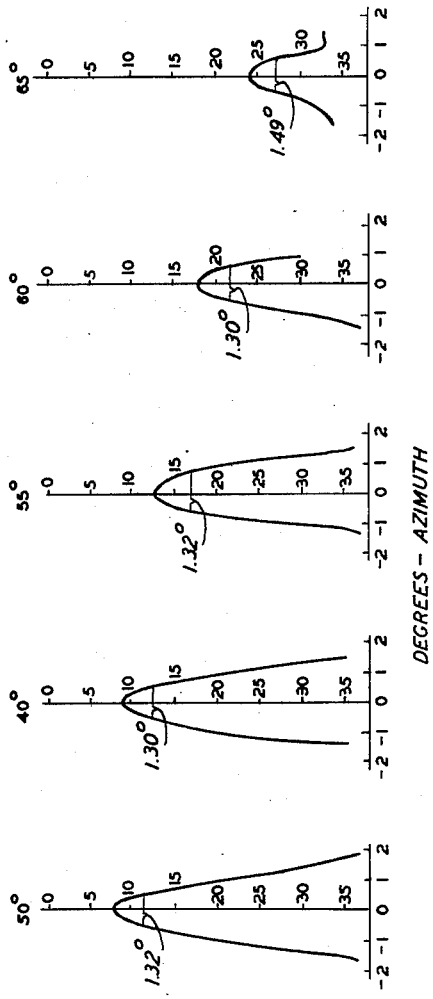
FIG. 21
INVENTOR
C.C.CUTLER
BY
A.J. Zerbarini
ATTORNEY Patented Sept. 28, 1954

2,690,508

UNITED STATES PATENT OFFICE 2,690,508

DIRECTIVE ANTENNA SYSTEM

Cassius C. Cutler, Gillette, N. J., assignor to Bell Telephone Laboratories, Incorporated, New York, N. Y., a corporation of New York Application January 10, 1947, Serial No. 721,243

11 Claims. (Cl. 250—33.65)

This invention relates to antenna systems and especially to directive antenna systems employing curved reflecting or deflecting surfaces.

Antenna systems possessing asymmetrical directivity patterns have been suggested for reflection type systems. In general, these patterns have been designated as fan beams or cosecant coverage beams, and have been characterized by a pattern that is relatively narrow in the plane of greatest resolution and is several times as broad in a plane perpendicular thereto. In addition, the so-called cosecant antenna is one having the property of producing, in a plane parallel to the reference plane of greatest resolution, a field strength that varies uniformly as the straight line distance between the antenna and the point of measurement varies. Antennas of this general type are disclosed in applicant's copending application Serial No. 547,399 filed July 31, 1944, now Patent No. 2,489,865 issued November 29, 1949, and also in the copending application of W. D. Lewis Serial No. 574,334 filed January 24, 1945 wherein parallel plate antenna members, of the so-called pill box type, are associated with cylindrical parabolic or quasi-cylindrical parabolic reflecting surfaces. Systems utilizing reflecting surfaces of double curvature have also been suggested.

One of the primary objects of this invention is the improvement of the direction resolving powers of an antenna system.

The invention has as another object the provision, in an antenna system, of a choice of directivity patterns in a plane perpendicular to its plane of greatest resolution, without necessitating the substitution of any of the antenna components.

According to this invention the vertical plane directivity pattern of a microwave antenna system employing cosecant energy distribution may be varied within wide angular displacements, without interruption in the use of the antenna. This change in system directivity is accomplished by controlling the pattern of one of the constituent parts.

The invention makes possible the virtual elimination of undesirable diffraction effects, commonplace in many antenna systems, through control of the intensity of the electromagnetic field in the immediate vicinity of the boundary of a reflecting component.

The invention also permits use of the optimum electric vector polarization, vertical or horizontal, for the conditions surrounding the intended use of the antenna system.

In addition to the foregoing, the invention makes possible the production of antenna systems possessing a high degree of resolution in a given plane, which resolution is maintained, in a plane perpendicular thereto, through greater than usual angular displacements. The invention also greatly facilitates securing a desirable directivity pattern by virtually eliminating interfering wave components which normally arise from spill-over or direct radiation, from double reflection of portions of the energy beam or from interposition of one, or more, of the antenna members within the main energy field.

The manner in which the invention accomplishes the above, and other, results may best be appreciated from the following description, when considered with reference to the drawing in which:

Fig. 1 is a perspective view of one embodiment of the invention employing horizontally polarized waves and a parallel plate antenna member of the pill box type;

Figs. 2, 3 and 4 are front, top and side views respectively of the arrangement shown in Fig. 1;

Figs. 5, 6, 7, 8 and 9 are illustrative graphs indicating various aspects of the directivity pattern of an antenna system, such as shown in Fig. 1;

Figs. 13, 14 and 15 are respectively side perspective, side elevation and plan views of an embodiment, arranged for vertically polarized waves, and using a parallel plate antenna member that may be arranged for scanning operation;

Fig. 16 is an enlarged view of a section of Fig. 14;

Figs. 17 to 21 are graphical illustrations of various aspects of the directivity pattern of an antenna system such as shown in Fig. 13.

Figure 6:
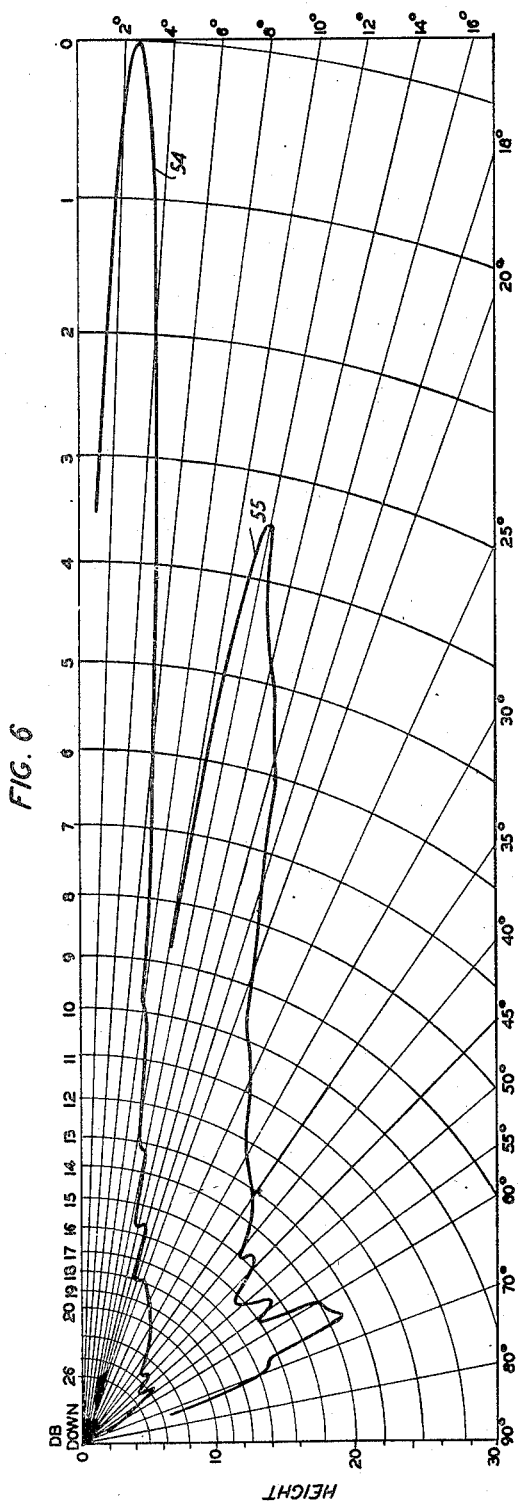

In one of its embodiments the invention makes possible an antenna system that is eminently suited for navigational, searching and bombing operations from high and low altitude aircraft. Conversely, the antenna is equally adapted for use in a defensive system for the detection of such craft. The system has in one plane a directive pattern that closely approximates the idealized cosecant pattern throughout exceptionally wide angles. This pattern may be changed at will to extend or to restrict the cosecant coverage to correspond with the requirements of low altitude searching and high altitude bombing operations. The horizontal resolution is maintained throughout large vertical displacements in either of the operating conditions.

Because of certain properties of electromagnetic waves at the so-called microwave frequencies it is desirable to employ horizontally polarized waves under certain conditions and to employ vertically polarized waves under certain other conditions. Figs. 1 to 4, inclusive, indicate a structure, embodying this invention, for use with horizontally polarized waves. In this wave the electric vector is in a plane parallel to the parallel plates 30 and 31 of the parallel plate antenna member 33. In this structure a concave reflector 34, of the general shape of a snow shovel and having an effective focal line 35 has at least a portion of one edge 36 parallel to the focal line 35. To impart mechanical rigidity, the metallic webs, or struts, 46 are affixed to the face of the reflector 34, in a position perpendicular to the waves electric vector. This reflector is fed from the rear, as distinguished from the usual front feed arrangement, by a parallel plate antenna member 33 which is preferably composed of a cylindrical parabolic section to the ends of which the parallel plates 30 and 31 are attached to enclose an air dielectric channel. To adapt this unit for the rear feed arrangement the dielectric channel enclosed between the parallel plates 30 and 31, is continued around the edge of the lower plate 31 by the deflecting cylinder or cowl 37. Whereas, in the normal pill box the aperture is formed by the parallel plates, the use of the cowl 37 causes the aperture 38 to face the concave reflector 34 and to be bounded on one side by the edge of the lower plate 31 and on the other side by the cowl 37. In practicing the invention, the aperture 38 is considered to be a uniphase linear aperture member, the longitudinal dimension of which substantially coincides with the focal line 35 of the concave reflector 34. The entire parallel plate member 33 is so situated that its lower plate 31 contacts, or optionally is in proximate relation to, the concave reflector 34 along its upper edge 36, and forms a conductive surface between that edge and the aperture 38.

The quasi-parabolic or snow shovel reflector 34, having the shape described below and taken by itself, is not applicant's invention. This reflector is shaped so as to produce a cosecant pattern. In more detail, the reflector 34 has a composite curvature along its transverse, or vertical, dimension. The lower portion of the reflector follows a substantially parabolic curvature, corresponding to the focal line 35, and acts to direct incident energy received from this focal line region into a forwardly directed beam in the direction 32. This energy is the major factor in the low altitude directivity pattern, and in consequence, the low altitude requirements of the intended service will control the shape of this area. The upper area of the reflector departs from the parabolic curve by being bent forward with increasing curvature to direct its incident energy, received from the region of the focal line 35, downwardly in the direction 32'. The curvature of this upper area is primarily controlled by the high altitude requirements of the intended service. In the transition area, between these upper and lower areas of the two extremes, the reflector contour should be so chosen to secure a smooth joining of the two areas without forming a definite line of demarcation. The entire reflector is so shaped that energy originating along the focal line 35 and incident upon its surface is not reflected back into the aperture 38 after reflection. As a general rule, the reflected wave should clear the lower edge of the hinged flap 39 by approximately 1.5 wavelengths to assure the elimination of shadow interference. Elimination of double reflection interference, caused by energy reflected from the inwardly curved upper area striking the parabolic curvature of the lower area, may be accomplished by providing ray clearance along the lower edge 45 approximately equal to $$1.5\frac{X}{R}$$

wavelengths; where X is equal to the over-all length of the chord connecting the interfering point and the first point of reflection, and R is equal to the distance from the top of the reflector to the point of convergence of the ray.

The directivity pattern of the entire system is a combined function of the action of the concave reflector 34 and the directivity pattern of the aperture 38. The pattern of the aperture 38 is in turn a combined function of the angle through which the energy is turned by the deflecting cylinder 37 and the position of the hinged flap 39. Movement of this flap 39 influences the directive pattern of the aperture, and of the antenna system, by controlling the relative amount of energy distributed between the upper and lower areas of reflector 34. This effect will be discussed in connection with the description of Fig. 6. Any reflected impedance arising from bending the waves around the curved dielectric path to the aperture 38 may be minimized by an optimum positioning of the longitudinal edge of the lower plate 31.

In operation, the translation device 42 (Fig. 3), which may be a radar transceiver, supplies horizontally polarized electromagnetic wave energy to the connecting wave guide circuit 43. This guide passes through a slot in the surface of the concave reflector 34 and after making a 180-degree bend in the magnetic plane terminates as an open-ended wave guide, or optionally in a directive horn, at substantially the short focal line of the parallel plate antenna member 33. As is well understood, the parabolic section of member 33 converts, in a plane parallel to the plates 30 and 31, an incoming circular wave front to a linear wave front. As previously mentioned the deflecting cylinder, or cowl, 37 formed by curving the top plate 30 around the linear edge of the bottom plate 31, serves to continue the dielectric channel around this enclosed edge, and to cause the substantially rectangular aperture 38 to face the concave reflector 34. As in the normal pill box reflector the wave appearing in the aperture 38 has a substantially flat front because it is linear in the direction parallel to the plates, as explained above, and also linear in a direction perpendicular to the plates since the short transverse dimension is of the order of one-half wavelength. After leaving the enclosing surfaces the transverse vector takes on a cylindrical contour, and is reflected by the substantially parabolic curvature of the lower area of reflector 34 into a plane wave front in the direction 32. The portion of the wave incident upon the upper area is reflected downward in the direction 32', because of the increased curvature in that area, to contribute the vertical distributional effect. The flap 39 presents a pivotally mounted conductive surface along the longitudinal dimension of the aperture 38. This surface, in addition to influencing the directional pattern of the aperture 38, virtually eliminates all direct rearward radiation from the aperture 38, since it will not support, at a point tangent to its surface, an electromagnetic field in which the electric vector is parallel to the plane of the surface. This property effectively eliminates spill-over from the horizontally polarized waves. In addition to eliminating direct rearward radiation, the positioning of the hinged flap 39 so controls the radiation pattern of the aperture 38 that the lower edge 45 of the reflector 34 is subjected to an electromagnetic field that has been gradually and smoothly reduced to a level whereby diffractive effects occurring along this discontinuity are rendered unobjectionable.

The plate 31 extends from the edge of the aperture 38 to the edge 36 of the curved reflector 34, and its function is similar to that of the hinged flap 39. In like manner, this plate presents a conductive surface that will not support a horizontally polarized electromagnetic field at a point tangent to its surface. As a result, low field intensity is assured for the region in this immediate vicinity and the field is decreased to zero at the reflector edge 36. This low field intensity effectively eliminates spill-over along the lateral edges of the plate 31 and substantially eliminates diffractive effects along the upper edge 36 of the reflector 34. Fig. 6 illustrates a directive pattern 54 useful at low altitudes and a directive pattern 55 useful at high altitudes, for the embodiment just described.

Figure 5:
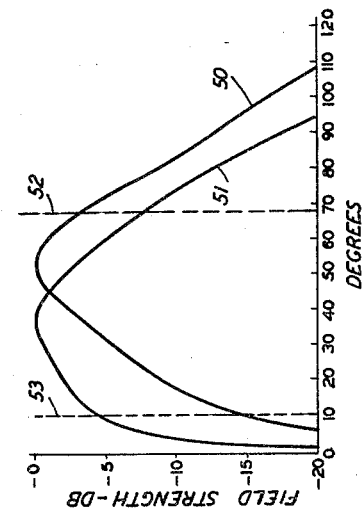

As previously stated, the angular positioning of the hinged flap 39 makes possible the two directivity patterns of Fig. 6, by controlling the directivity pattern of the antenna aperture 38. Fig. 5 graphically indicates measured relative field intensities created by an antenna member similar to the parallel plate member 33 when radiating waves having the electric vector horizontally polarized. In this graph the field intensity, expressed in decibels, is shown for various angles α measured in a counter-clockwise direction from the parallel plate 31. Curve 50 indicates measured relative field intensities when the plane of the hinged flap 39 described an angle of 105 degrees with the plane of the parallel plate 31. This corresponds to the position for low altitude operation in this described example. Curve 51 indicates measured relative field intensities for the same conditions as indicated above, but in which the angular relation of the hinged flare has been changed to 75 degrees, corresponding to the position for high altitude operation.

It will be noticed, in this latter case, the entire curve has been moved toward the smaller angles of displacement. The angular position indicated by the line 52 indicates the region on the surface of the concave reflector 34 that principally contributes to the beam maximum in the forward, or horizontal, direction 32. The angular position indicated by the line 53 indicates the corresponding region on this reflector surface that principally contributes to the downward energy distribution to form the so-called cosecant distribution. Reduction of the angle between the parallel plate and the hinged flare increases the energy distributed over the upper surface of greatest curvature and decreases the energy contributed by the lower surface of parabolic curvature to the forward, or horizontal beam. In either position of the flap 39 the field strength is rapidly decreasing as the surface of the conductive plate 31, and the reflector upper edge 36, are approached. Similarly, as the bottom edge 45 of the reflector is approached the field strength undergoes considerable reduction and thereby reduces undesirable diffractive effects.

Fig. 6 indicates, in polar coordinates, the measured relative energy distribution, and response, pattern of a directive antenna system, such as has been described, employing horizontally polarized waves. The low altitude curve 54 corresponds to the energy distribution curve 50 of Fig. 5 with the hinged flap 39 at its widest angular displacement. In this case the axis of maximum response 32 (Fig. 3) is inclined at an angle of about two and one-half degrees, below the horizontal plane. The energy distribution closely approaches the idealized cosecant function, which would appear as a straight line in these coordinates, from the point of maximum response to angles about 55 degrees below the horizontal. The high altitude curve 55 corresponds to the curve 51 of Fig. 5 and indicates the effect on the over-all system operation of changing the position of the hinged flap 39 to an angular displacement of about 75 degrees. The maximum response axis 32 has been changed to an angle of about 12 degrees below the horizontal and the energy distribution now closely approaches the desired cosecant coverage up to angles of about 70 degrees below the horizontal. In this case the antenna gain along the axis of maximum response is 34.3 decibels absolute as compared to a gain of 37.8 decibels absolute for the antenna in the low altitude position corresponding to curve 54.

Figs. 7 and 8 show in rectangular coordinates the low and high altitude measured characteristics respectively of an antenna system constructed and operated in accordance with the foregoing description. In this case the operating frequency was somewhat lower than obtained for curves 54 and 55 of Fig. 6. Fig. 7 indicates the relative field strengths in the vertical plane for various angular deviations from the axis of maximum response. The curve 56, akin to curve 50 of Fig. 5 and curve 54 of Fig. 6, has its axis of maximum response approximately 7 degrees below the horizontal plane and closely approximates the idealized cosecant curve 57 for about 58 degrees. Curve 58 of Fig. 8 indicates the high altitude pattern of this system, akin to curves 51 and 55 of Figs. 5 and 6, respectively. The axis of maximum response has been shifted to about 17 degrees below the horizontal and closely approximates the ideal cosecant curve 59 for about 50 degrees. Both the low altitude curve 56 (Fig. 7) and the high altitude curve 58 (Fig. 8) are asymmetrical about their axis of maximum response, thereby providing sharp cut-off and well suppressed minor lobes 60 and 61 in the undesired portion of the pattern. This minor lobe suppression greatly reduces interference caused by reflection from the underside of an aircraft or from the earth in case the antenna is utilized in a ground warning system.

The curves 57 and 59, representing the idealized cosecant functions have in each case been corrected to a horizontal axis of zero degrees for comparative purposes. As previously stated the curves 57 and 59 represent cosecant functions for angles $(a+7)$ and $(a+17)$ degrees respectively.

Figure 9:
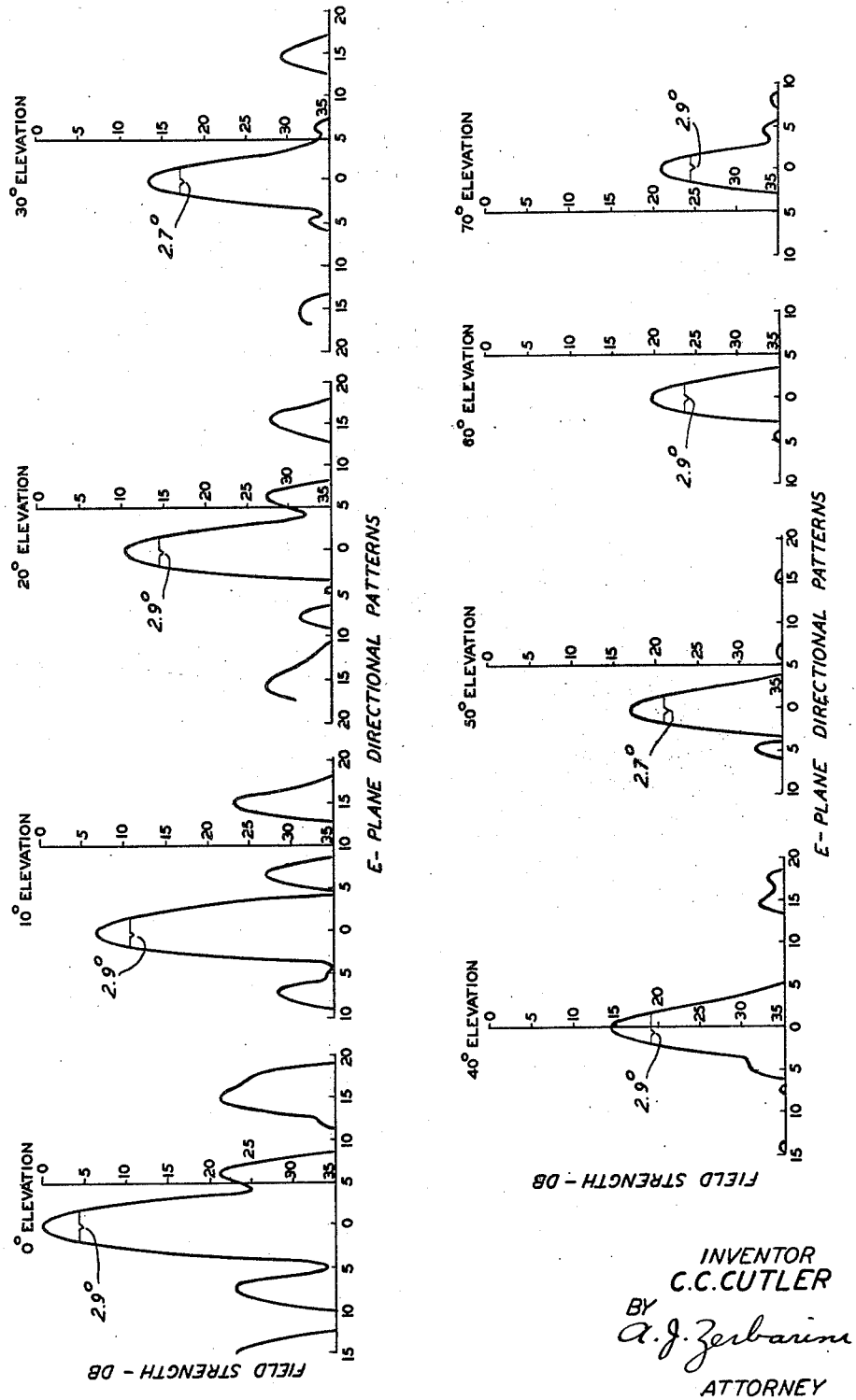

In Fig. 9 a series of eight graphs indicate the horizontal directivity pattern of the high altitude beam, corresponding to the curve 58 of Fig. 8, for various elevational angles above the horizontal plane. In each case the relative antenna response in decibels is plotted for angular displacements to the right and left of the axis of maximum response. In all cases the beam is symmetrical about its maximum response axis and at the half power point, corresponding to a level of 3 decibels less than the peak value, the beam width is equal to or less than 2.9 degrees for all angles up to and including 70 degrees of elevation.

Figure 10:
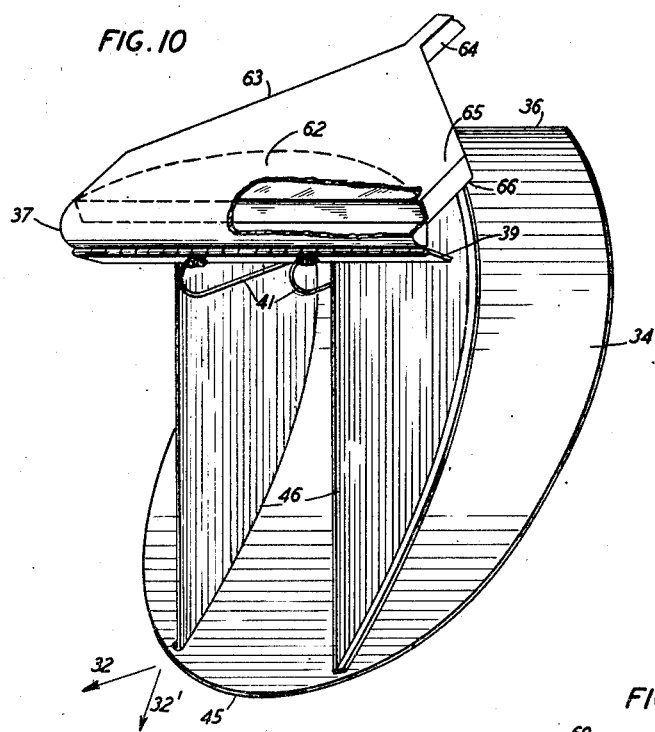
Fig. 10 is a perspective view of one embodiment of the invention using a parallel plate antenna member of the sectoral horn type.

In Fig. 10 there is shown a perspective view of an embodiment of the invention utilizing a sectoral horn as one of the antenna members in a system employing horizontally polarized waves. In general, the operation of this system is sufficiently similar to that of the system of Fig. 1 previously described so that only the differences in the two systems will be described. The translation device (not shown) supplies horizontally polarized electromagnetic energy to the connecting wave guide member 64, or receives horizontally polarized waves from member 64. This wave guide is connected to the sectoral horn 63 which comprises the parallel plates 65 and 66 which are preferably separated approximately one-half wavelength. As in the previous case of the pill box member 33 (Fig. 1) the upper parallel plate 65 is extended along a circular path around the outer edge of the lower plate 66 to form a deflecting cylinder 37 enclosing an elongated substantially rectangular aperture (not shown). The lower plate 66 is spaced a small distance from the edge 36 of the reflector 34. If desired, however, the plate 66 and the edge 36 may be in direct contact. The sectoral horn is inherently bifocal, as explained in my copending application, Serial No. 665,027, filed April 26, 1946 now Patent No. 2,548,655 issued April 10, 1951 and therefore does not function to establish a cylindrical wave front, as is required for optimum energization of a reflector or a lens having a line focus. To provide a unifocal cylindrical wave front at the line aperture a dielectric lens 62 is interposed in the dielectric channel enclosed by the parallel plates 65 and 66. For the purpose of this explanation it is sufficient to note that the longitudinal vector, in this case the electric vector, of the wave is converted to a uniphase front after passing through the lens 62. As previously described, this uniphase wave energizes the focal line 35 of the concave reflector 34 and part of the energy is reflected forward along the axis 32 of maximum response. A lesser part of the energy is directed downward in the direction 32' to form the desired wide angle cosecant pattern. As was previously explained, the system distributional pattern is a function of the position of the hinged flap 39, the position of which is controlled by the operation of the push rods 41 actuated by a solenoid (not shown).

Figure 11:
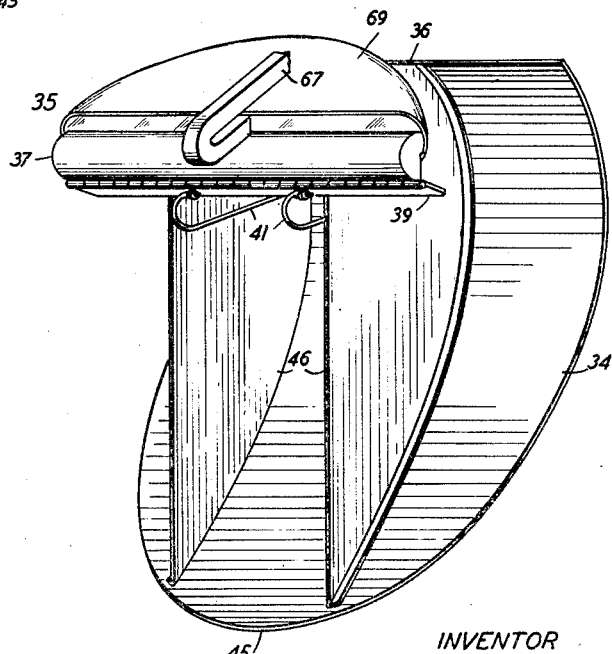
Figs. 11 and 12 are perspective and side views respectively of an embodiment of the invention employing horizontally polarized waves and a parallel plate antenna member of the deflecting type, and having a quasi-toroidal shape.
Figure 12:
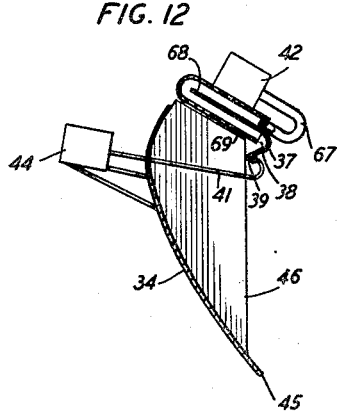

Figs. 11 and 12 show an embodiment of the invention employing a parallel plate antenna member of the deflector type. The antenna member is of a quasi-toroidal shape comprising an inner metallic plate 68, an outer metallic plate 69 and the air dielectric path or channel included therebetween. As in the previously described arrangements the deflecting cylinder 37 has been formed by carrying one plate in this case the inner plate 68 around the outer edge of the lower, or outer plate 69, to form an elongated, substantially rectangular aperture 38 facing the concave reflector 34 and substantially coinciding with the focal line 35 of the parabolic portion of the reflector. For a detailed description of the operation of this antenna member reference should be made to the above-mentioned copending application. For the purpose of the description in this embodiment it is sufficient to note that the lower outer plate 69 of the quasi-toroidal member is spaced at least one-half wavelength from the inner plate 68 and is spaced a short distance from the upper edge 36 of the concave reflector 34. If desired, this plate 69 may make direct contact with this upper edge 36. The conductive flap 39 is pivotally mounted at the edge of the cylindrical deflector 37 along the longitudinal dimension of the aperture 38. The controls executed by the conductive surfaces of the plate 69 and the pivoted flap 39 are the same as in the previously described embodiments. Positioning of the hinged flap 39 is accomplished by movement of the push rods 41 as actuated by the solenoid 44. The effect of this movement is the same as was described for the embodiment of Fig. 1.

All of the foregoing structures have had as a common factor the use of electromagnetic waves having a horizontally polarized electric vector, parallel to the parallel plate surfaces. For certain operating conditions it is desirable to use electromagnetic waves wherein the electric vector is vertically polarized, that is, polarized perpendicular to the parallel plates. When waves of this nature are employed in the previously described structures they appear to cling to the conductive surfaces of the parallel plate and pivoted flap because of the currents flowing therein in the direction of propagation. For this reason it is difficult to obtain, either for transmission or for reception, a desirable energy distribution pattern of the aperture for operation in conjunction with the concave reflector 34. In addition, because of this apparent clinging effect the direct radiations rearward, around the edge of the flap 39, and the field intensity in the immediate vicinity of the upper edge 36 of the concave reflector 34 are a great deal larger than desired. The actual measured relative field intensities for an elongated, substantially rectangular aperture formed by a parallel plate antenna member similar to the pill box member 33 of Fig. 1 when used with vertically polarized waves, is indicated by the curve 70 of Fig. 17. This curve indicates the best measured result actually obtained through the use of simple conductive surfaces for the hinged flap 39 and the lower plate 31 (Fig. 3). The apparatus and method used in the measurements were substantially the same as those used for the curves 50 and 51 of Fig. 5. In this case the separation between the parallel plates was reduced to about one-quarter wavelength to reduce the possibility of excitation at other than the desired mode and the operating frequency was also greater than was used for the curves of Fig. 5. From curve 70 it will be noted that the energy distribution does not follow a smoothly changing pattern that decreases the field intensity to zero in the immediate vicinity of the conductive plate 31 (Fig. 3), corresponding to the reflector edge 36. It is also noticeable that the field intensity at the higher angles, corresponding to the lower edge 45 of the reflector 34, is much greater than was observed for the horizontally polarized wave of Fig. 5. Although optimum physical dimensions of the simple conductive surfaces were used to produce the high altitude pattern of curve 70, shifting the hinged flap 39 to its low altitude position greatly deteriorated the pattern. For this reason it appears that plane conductive surfaces are not suitable for use in a dual pattern antenna system using vertically polarized waves.

To avoid the undesirable effects introduced by the use of vertically polarized waves the surfaces of the hinged flap 39 and the lower parallel plate 73 in the embodiment of Fig. 13 are corrugated, rather than smooth as in the embodiment of Fig. 12. This arrangement is shown in more detail in Fig. 16, and will be further described in connection with a description of that figure. The corrugated surface taken by itself is disclosed and claimed in my copending application Serial No. 68,549, filed December 31, 1948, now Patent No. 2,659,817, issued November 17, 1953. For the purposes of this disclosure it is thought a comparison of the measured distributional pattern of an antenna member employing these surfaces, with the measured distributional pattern of a similar member employing smooth conductive surfaces will be sufficient. This comparison will be indicated in connection with a discussion of the curves 80 and 81 of Fig. 17.

In Figs. 13 to 16, inclusive, there is shown an embodiment of the invention intended for use with vertically polarized waves. In this case the wave's electric vector is perpendicular to the parallel plates 72 and 73 of the parallel plate antenna member 71. With reference to these figures, the parallel plate antenna member 71, comprising the parallel plates 72 and 73, encloses a dielectric channel, including the dielectric lens 76. Although the invention is not restricted to any particular type of antenna member, the parallel plate member 71, here shown, is of the reflector scanning type such as is described and claimed in the copending application of W. D. Lewis, Serial No. 789,602, filed December 4, 1947, now Patent No. 2,585,562, issued February 12, 1952. In its general operation, this member 71 resembles a flat or sectoral horn. A pair of parallel plates 72 and 73 relocate the horn mouth opening from its normal position to the outward edge of the plates 72 and 73 where the deflecting cowl or cylinder 37 turns the dielectric channel so that the rectangular aperture 38 is substantially aligned with the focal line 35, and faces the curved reflector 34 as in the previously described embodiments. The movable flap 39, actuated by the solenoid 44 and the push rods 41, is pivotally mounted along the lower longitudinal edge of the aperture 38, and is used for controlling the directivity characteristics of this aperture as it did in the case of horizontally polarized waves. The rear portion 75, of the member 71, corresponding to the flare or bell portion of a sectoral horn, is rolled in a circular fashion, in such manner that the portion that would normally form the throat aperture of the sectoral horn, forms a continuous circular or ring opening suitable for receiving energy from, or delivering it to, the radar transceiver unit 42. By suitable coupling methods, as discussed in the above-mentioned application, this circular or ring aperture may be energized to produce a beam capable of scanning action on either side of the center axis of the member 71. As in the case of the sectoral horn 63 of Fig. 10, this parallel plate member 71 is essentially bifocal. To produce a substantially uniphase electromagnetic wave in the aperture 38, the dielectric lens 76 is included in the channel between the parallel plates 72 and 73. Also, as in the previous embodiments, the lower parallel plate 73 extends from the aperture 38 to the edge 36 of the curved reflector 34. The curved reflector 34 may have the same general shape of a snow shovel, as mentioned in the previously described embodiments. The general considerations governing the shape of the reflector in those previous embodiments apply with equal force in this embodiment. In adapting the reflector 34 for use with vertically polarized waves it is necessary that the metallic bracing webs or struts 46 (Fig. 1) be removed from the reflecting surface of the curved reflector 34. In the case of the horizontally polarized wave, these webs or struts 46, are perpendicular to the electric vector and cause no appreciable distortion. When vertically polarized waves are employed, these struts 46 are parallel to the electric vector, and act as short-circuiting elements. For this reason all bracing ribs 88, used to impart mechanical rigidity to antenna structures of the invention designed for use with vertically polarized waves, are placed on surfaces that are not contacted by the electromagnetic waves, i. e., on the rear surface of reflector 34 and the upper surface of plate 72, as shown in Figs. 13, 14 and 15.

As previously stated, and as indicated by the curve 70 of Fig. 17, the use of plane conductive surfaces with vertically polarized waves was found to be impracticable. To avoid the terminating effect of these surfaces, whereby the electromagnetic field of high intensity was maintained at a point tangent to the surfaces, the corrugations or grooves 74 of Fig. 16 were introduced. These grooves have their longitudinal dimension normal to the direction of wave propagation, and parallel to the longitudinal dimension of the rectangular aperture 38. The velocity of a vertically polarized electromagnetic wave adjacent to this corrugated surface depends upon the depth 78 of the groove 74; varying from free space velocity at zero depth to zero velocity at a depth of one-quarter wavelength. For vertically polarized waves the variation of field strength away from the grooved surface changes from a slow negative exponential decrease with a shallow groove 74 to a very fast exponential decrease as the groove depth approaches one-quarter wavelength. At one-quarter wavelength depth, the variation of field intensity with distance from the surface changes from a large negative exponential, to a large positive exponential. This relation may be considered the same as changing the surface from an electrical conductor at zero groove depth to a magnetic conductor when the groove depth equals one-quarter wavelength. Accordingly, the grooves 74 are made with a depth 78 equal to one-quarter wavelength to achieve minimum field intensity at points tangent to the surfaces of the lower plate 73 and the pivoted surface or flap 39. Test results indicate that the separation 77 between grooves is not particularly critical, being preferably in the neighborhood of one-eighth wavelength or less, and should not closely approach one-half wavelength. In order to secure a more advantageous energy distribution in the upper portion of the curved reflector 34 it may be desirable under some circumstances, to use grooves 74 having a depth 78 in excess of one-quarter wavelength. This may be accomplished by increasing the actual depth of the groove, or by effectively increasing the depth through the use of a suitable dielectric. In this case the field strength away from the grooved surface changes from a large to a small positive exponential decrease as the depth approaches one-half wavelength. The rate of change of the field near the surface may be predicted from the relation:

$$E = e^{-\frac{2\pi}{\lambda} Ky} \tan \frac{2\pi l}{\lambda}$$

where $K$=ratio of width of groove to center line separation, $l$=depth of groove, $\lambda$=wavelength at the operating frequency and $y$=distance from the outside conductive surface.

In the tested embodiment of Fig. 13 the first groove 74, next adjacent to the aperture 38, was filled with a dielectric material and thus made effectively deeper than one-quarter wavelength to improve the field distribution in the immediate vicinity of the aperture. By controlling this field distribution the impedance mismatch in this region was reduced to a minimum value. In its operating characteristics the embodiment of Fig. 13 closely resembles the previously described arrangements. Vertically polarized electromagnetic waves are supplied by the translation device 42, which may be a radar transceiver, to the circular or ring opening (not shown) and the rolled section 75 of the rolled reflector scanner 71. The dielectric lens 76 converts the wave energy into a substantially uniphase wave along its longitudinal dimension. Because the parallel plates 72 and 73 are separated by only approximately one-quarter wavelength the wave is substantially uniphase in its transverse dimension as it emerges from the lens 76 to be turned by the deflecting cylinder 37 and guided to the aperture 38. As before, the aperture 38 is considered to be the substantial equivalent of a line antenna member having its longitudinal dimension substantially aligned with the focal line 35. As previously described, the lower portion of the reflector 34 principally forms the forward component 32 of the beam and the inwardly curved upper portion of the reflector 34 contributes the downward component in the direction 32'. The push rods 41, actuated by the solenoid 44, control the position of the pivoted flap 39 to influence the energy distributional pattern of the aperture 38. By controlling this pattern the distribution of energy upon the reflector 34 is controlled and the desired high and low altitude patterns are obtainable.

It will be recalled that curves 50 and 51 of Fig. 5 indicated the relative energy distribution from the aperture 38 for horizontally polarized waves, and curve 70 of Fig. 17 indicated the relative energy distribution from the aperture 38 for vertically polarized waves, when simple conductive surfaces were used in both cases for the pivoted flap 39 and the surface of the plate 31 (Fig. 3). The curves 80 and 81 of Fig. 17 indicate the relative energy distribution for the aperture 38 of Fig. 14 when vertically polarized waves are used in a structure, such as has been just described, using grooved surfaces on the hinged flap 39 and the plate 73. Curve 80 indicates this distribution for counterclockwise angular displacements from the surface of the parallel plate 73 for the so-called low altitude pattern wherein the plane of the pivoted flap 39 described an angle of about 105 degrees with the surface of the plate 73. Curve 81 depicts similar data for the high altitude pattern wherein the pivoted flare angle was reduced to about 75 degrees. It will be noted that the energy distribution of both curves 80 and 81 closely approximate the distribution obtained with the horizontally polarized waves under corresponding conditions as shown by curves 50 and 51 (Fig. 5). In either case the distribution is much superior to that shown by curve 70 for the optimum condition using simple conductive surfaces with vertically polarized waves. As in Fig. 5 the angular positions indicated by the lines 52 and 53 indicate the regions on the surface of reflector 34 that principally contribute to the forward and downward beam components respectively. Although the entire surfaces of the flap 39 and the lower plate 73 were grooved in this tested embodiment, additional tests have indicated that the entire distance between the aperture 38 and the edge 36 of the reflector 34 need not be grooved. Satisfactory test results have been obtained with an embodiment similar in all respects to that shown herein except that the surface of the plate 73 was grooved for only about four inches back from the edge of the aperture 38.

Fig. 18 shows in polar coordinates the low and high altitude vertical patterns 82 and 83 respectively, for a cosecant antenna system constructed in accordance with the foregoing. In this case the direction of maximum response is inclined at an angle of about 2.5 degrees and 19 degrees below the horizontal plane. These curves are comparable in all respects to the curves 54 and 55 of Fig. 6 for the horizontally polarized wave.

Figure 19:
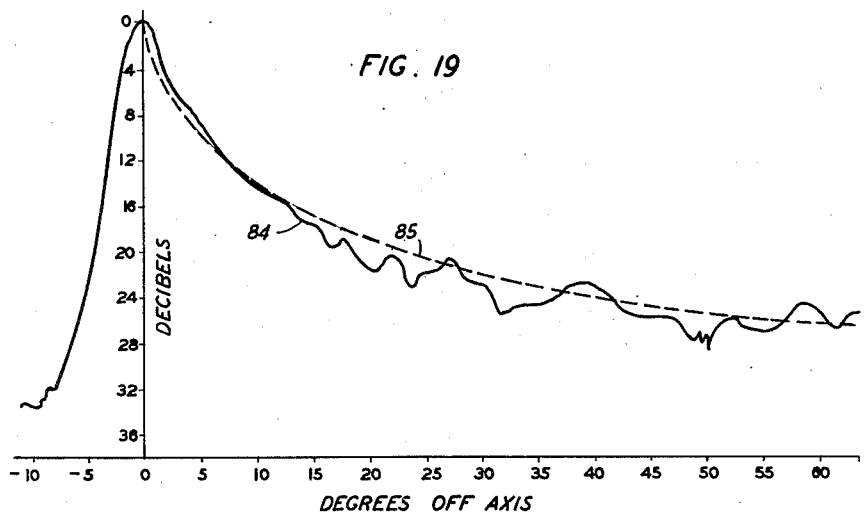
Figure 20:
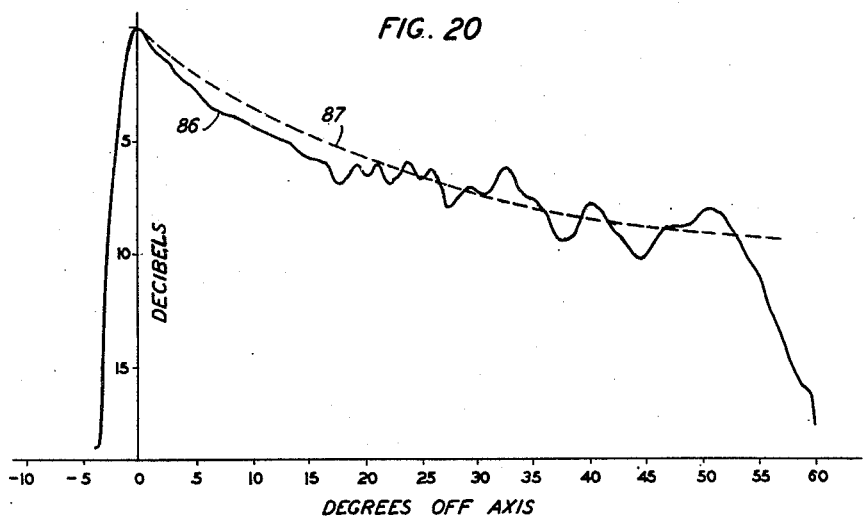

Figs. 19 and 20 show respectively, in rectangular coordinates, the vertical patterns, for the low altitude curve 84 and the high altitude curve 86, together with corresponding idealized cosecant function curves 85 and 87, for the antenna system of Fig. 13 using the corrugated surfaces shown in Fig. 16. For this particular embodiment the high and low altitude conditions gave antenna gains of 31.5 decibels and 35.3 decibels respectively, at an operating frequency corresponding to a wavelength of approximately 1.25 centimeters. Except for the operating frequency, which was higher in this latter case, these curves are comparable in all respects to the curves 56 and 58 of Figs. 7 and 8 for the horizontally polarized curves. As the axis of maximum response for curves 84 and 86 are inclined at angles of about two and one-half degrees and 19 degrees respectively below the horizontal plane, the idealized cosecant function curves 85 and 87 have been similarly shifted for comparison purposes. In both instances the measured field strengths closely approximate the theoretical values.

The invention makes possible an antenna system having a high degree of resolution in one plane which resolution is maintained through wide angular displacements in a perpendicular plane as shown by Fig. 21. For these tests the pivoted flare was adjusted for the high altitude position and the field strength was recorded over several degrees to the right and left of the axis of maximum response for various angles of elevation from the horizontal plane. From this figure it will be noted that the horizontal beam width of the curve 90 for zero degrees of elevation is about 1.28 degrees at its half power point 91. The minor lobes 92 and 93 are depressed 22 decibels and 25 decibels respectively from the beam maximum. From the various graphs it will be noted that the beam width at the various half power points increases to a maximum of about 1.4 degrees at an angular elevation of 30 degrees and decreases to a width of about 1.3 degrees at an elevation of 60 degrees. In all measured cases the minor lobes were well depressed below the beam maximum.

Although the invention has been described in connection with an antenna system comprising curved reflectors of specified types in order to secure the desired energy distribution, it will be obvious to those skilled in the art that the invention is not so limited and may be practiced in other manners.

What is claimed is:

1. In an antenna system, a reflector having a longitudinal edge and a focal line, an antenna member having conductive walls enclosing a dielectric channel, said channel forming an arcuate path about one edge of one of said walls and having a substantially linear aperture facing said reflector, said aperture and said focal line being substantially coincident, and one of said walls of said antenna member extending from said aperture towards said reflector edge.

2. In an antenna system, a quasi-parabolic cylindrical reflector having a focal line, a primary antenna member comprising four surfaces so disposed as to form at one end a substantially linear aperture, said aperture facing said quasi-parabolic reflector and being substantially coincident with said focal line, one of said surfaces being contiguous to one margin of said reflector, and a conductive surface pivotally attached along an edge of said linear aperture.

3. In combination a first and a second antenna member said first member comprising four conductive surfaces, a dielectric channel enclosed by said surfaces, said channel being curved about an extremity of one of said surfaces and terminating in a substantially linear aperture facing said second member, said second member comprising a cylindrical quasi-parabolic reflector having a focal line, and an edge substantially parallel to said line, said focal line of said second member being substantially coincident with said linear aperture, and a conductive surface of said first member extending from said aperture to said second antenna member and touching said member along its said edge.

4. In a directive antenna system, a quasi-parabolic cylindrical reflector having a focal line and a linear edge, a parallel plate antenna comprising a plurality of conductive walls forming a dielectric channel, a concave conductive member attached to one of said walls and encircling one extremity of one of said conductive walls and forming therewith a substantially linear aperture, said aperture being aligned with said focal line and facing said reflector a metallic flap pivotally attached to an edge of said concave member, one of said walls extending from said aperture to said reflector and paralleling said linear reflector edge.

5. In an antenna system a first cylindrical parabolic reflector, a second quasi-parabolic cylindrical reflector having a focal line and a longitudinal edge, a pair of parallel end plates of different length attached to said first reflector, the longer plate being curved over one end of the shorter plate along a circular concave path, said plates forming with said first reflector a substantially linear antenna aperture facing said second reflector and aligned with its focal line, the shorter plate abutting on the longitudinal edge of said second reflector.

6. The combination in accordance with claim 5, a conductive surface pivotally attached to the edge of the longer of said parallel plates along a longitudinal dimension of said aperture, and means for moving asid pivotally attached surface.

7. In an antenna system a first and a second antenna member, said first member comprising a quasi-parabolic cylindrical reflector having a focal line and an edge parallel to said line, said second antenna member comprising a plurality of conductive surfaces enclosing a dielectric channel, said channel following an arcuate path about one extremity of one of said surfaces and terminating in a substantially linear aperture coincident with said focal line and facing said first member, a corrugated conductive surface extending from said aperture to the said first antenna member and touching said member along said edge, a corrugated conductive element pivotally attached to one of said conductive surfaces along a longitudinal edge of said aperture, and means for changing the position of said pivotally attached element whereby the energy distribution and reception characteristics of said antenna system may be varied.

8. In a directive antenna system, a cylindrical quasiparabolic reflector having a focal line and at least one edge substantially parallel to said line, an antenna member comprising a plurality of conductive plates enclosing a dielectric path, said antenna member having an elongated substantially linear closed end and an elongated substantially linear open end, an antenna element at said closed end, said dielectric path having at an intermediate point a circular parabolic curvature, a semicylindrical element attached to said member at said open end and extending said channel in a U-shaped path about an edge of said open end to terminate in an elongated substantially linear aperture coincident with said focal line and facing said reflector, a conductive flap pivotally attached to a longitudinal edge of said element, one of said plates extending from said edge of said reflector to an edge of said aperture for minimizing diffraction effects.

9. A directive antenna system comprising a concave reflector having a focal line and a straight edge extending parallel to said line, an antenna member comprising a conductive wall and having a linear aperture, said aperture being aligned with said focal line and having parallel longitudinal edges, said wall extending from one of said longitudinal edges toward said straight edge and a conductive flap pivotally attached to the other longitudinal edge, whereby diffractive effects at the aforesaid straight edge of the reflector are prevented and the directive action of said system may be changed.

10. A directive antenna system in accordance with claim 9, the surfaces of said wall and flap facing each other being smooth.

11. A directive antenna system in accordance with claim 9, the surfaces of said wall and flap facing each other being corrugated.

References Cited in the file of this patent

UNITED STATES PATENTS

| Number | Name | Date |
| --- | --- | --- |
| 2,156,653 | Illberg | May 2, 1939 |
| 2,270,965 | Peterson | Jan. 27, 1942 |
| 2,408,373 | Chu | Oct. 1, 1946 |
| 2,409,183 | Beck | Oct. 15, 1946 |
| 2,434,253 | Beck | Jan. 13, 1948 |
| 2,436,408 | Tawney | Feb. 24, 1948 |